Feb. 10, 1959  H. F. KRUEGER ET AL  2,872,741
EDUCATIONAL PUZZLE GAME
Filed Oct. 15, 1956
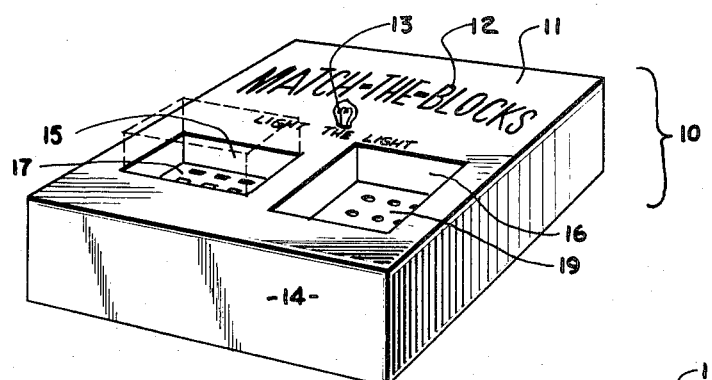
FIG. 1
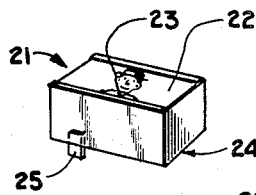
FIG. 2
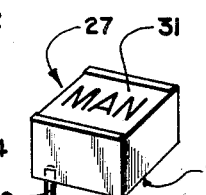
FIG. 3
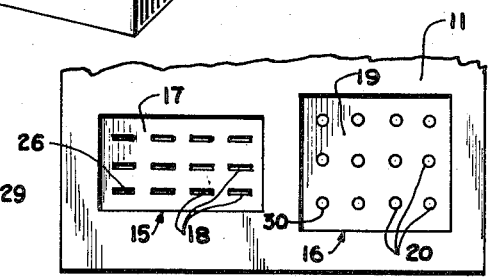
FIG. 4
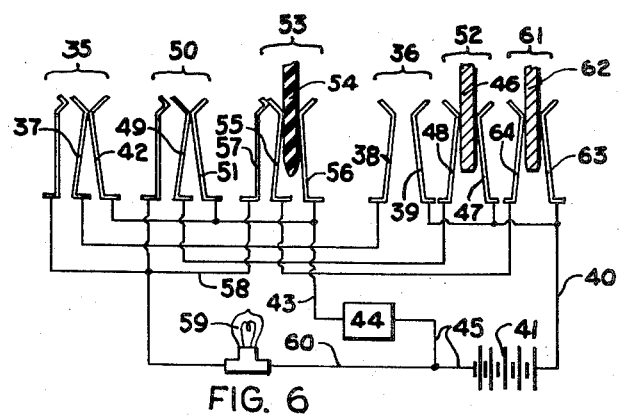
FIG. 6
FIG. 5
FIG. 7
FIG. 8
*INVENTOR.*
HARVEY F. KRUEGER
RUTH F. KRUEGER
BY R. W. Hodgson

United States Patent Office 2,872,741
Patented Feb. 10, 1959

2,872,741

EDUCATIONAL PUZZLE GAME

Harvey F. Krueger and Ruth F. Krueger, Richland, Wash., assignors of one-tenth to Gadget-Of-The-Month Club, Inc., Los Angeles, Calif., a corporation of California Application October 15, 1956, Serial No. 615,994

11 Claims. (Cl. 35—9)

This invention relates to educational game devices and, more particularly, to the means and method for playing a puzzle type of game best suited for children of primary and early elementary school age in which the correct answer to a question must be made in order to get a satisfactory response from the device.

It has been our observation in the past that the question and answer types of games and puzzles heretofore available for children were frequently unsatisfactory since they included no satisfactory means for informing the players whether or not the correct replies were given, or for enabling the players to discover the correct answers themselves.

For this reason the games were dull and uninteresting to a single player and gave rise to repeated disagreements and arguments between persons playing the games in some competitive manner.

Also, the games that have come within the scope of our investigation, have been permanently stylized and were not amenable to variation and change to keep them interesting over an extended period of time.

Our invention has been made with the foregoing considerations in mind and can be said to have a plurality of important objectives.

One important object of our invention is the provision of a device with which a question and answer type of game involving the association of ideas may be played.

A further important object of our invention is the provision of a device and game to be played therewith which combines perception and association of ideas with manual dexterity.

A still further important object of our invention is the provision of a puzzle game means and method of the character described in which the answer made by a player to a question is immediately judged as being true or false by mechanical means within the device.

An additional object of our invention is the provision of a game means and method of the character described which is adapted so that it may be enjoyed by an individual alone or by any number of players.

And a further additional object of our invention is the provision of a game and a game device of the character described which is adapted to improve the memory ability and increase the knowledge of the players by means of the associations established between pictures, words and ideas covering a broad range of academic subjects and general interest.

In brief, the device of our invention consists of a cabinet having an oblong and a square recess in the face thereof and an electric light and a sound producing device such as a buzzer enclosed therein, and a plurality of blocks enterable in the recesses. A series of so-called "questions" is disposed on the outer surfaces of the oblong blocks, and a series of "answers" on the square blocks. The inner bottoms of the recesses are perforated to permit the movement therethrough of wedge members which are downwardly extended from the undersurfaces of the blocks. The wedges serve as actuators for sets of switches disposed interiorly of the cabinet, and the electrical circuitry is so arranged that the proper "answer" block must be inserted in the square recess in order to light the electric light, the buzzer being sounded in case of the insertion of incorrect, "answer" blocks.

If, for instance, the game is to be based upon the association of words or names with a set of corresponding pictures, the "question" blocks have pictures of various objects on their outer surfaces, and the "answer" blocks carry the corresponding words naming or identifying the objects.

In playing the game alone, the player might select from the plurality of "question" blocks a block bearing the picture of a man and press it into the oblong recess in the face of the cabinet. He then selects from the plurality of "answer" blocks the one bearing the word which he believes to be "man," and inserts it in the square recess of the cabinet. If the correct word, and consequently the correct block, is selected, the switches disposed within the cabinet are effective to light the light, whereas if the wrong block is selected, the buzzer is sounded.

As can be seen, if the player does not actually know the correct answer, he may still go through the "answer" blocks until he finds the one effective to light the lamp, thereby proving to himself what his answer should have been.

The electro-mechanics involved in the device are relatively simple. Each question block and each answer block has a wedge member downwardly extended from the undersurface thereof in a different relative position and adapted to actuate a different leaf spring switch within the cabinet. The "answer" switches are single throw and normally open, whereas the question switches are double throw and normally closed so as to communicate with the buzzer. Upon insertion of a "question" block in the oblong recess of the cabinet, its wedge member shifts the central contactor of the switch so as to direct current to the light bulb.

Each "answer" switch is effective when closed to direct current to the central contactor of the "question" switch. Thus, if the wrong "answer" block is inserted, current is directed to an "answer" switch which is in normally closed position communicating current to the buzzer, and the correct "answer" block must be selected and inserted in order to direct current to the one central contactor which is positioned so as to direct current to the electric bulb.

Other variations of the embodiment and other important objects of the invention will become apparent in the following detailed specification when taken with reference to the accompanying drawings, in which:

Figure 1 is a perspective diagrammatic view of the exterior of the cabinet of the device of our invention showing the oblong and square recesses therein;

Figure 2 is a perspective view of one of a plurality of oblong blocks used as a part of the game of our invention, showing the elongated wedge member depending from the undersurface thereof;

Figure 3 is a perspective view similar to that of Figure 2 showing one of a plurality of square blocks used in the game of our invention;

Figure 4 is a fragmentary plan view of the upper surface of the cabinet of the game device showing the two recesses and the arrangement of the apertures in the bottoms thereof;

Figure 5 is a perspective view of one of the blocks used in the game of our invention showing the method of changing the indicia on the upper surface, and the round wedge member extended downwardly from the undersurface thereof;

Figure 6 is a schematic wiring diagram illustrating the circuitry of the device;

Figure 7 is a view of the switch members disposed interiorly of the oblong recess in the cabinet, and Figure 8 is a plan view similar to Figure 7 showing the switch assembly disposed interiorly of the square recess in the cabinet of the device.

Reference is again made to Figure 1 showing the main structure of a device of our invention with the numeral 10 referring generally to the cabinet enclosure having disposed on its upper surface 11 the name of the device and other indicia 12, a small electric light bulb 13, and adjacent the bottom 14 thereof an oblong recess 15 and a square recess 16.

At the bottom of the oblong recess 15 is a transverse basal panel 17 better seen in Figure 4, having a plurality of slots indicated collectively as 18 therethrough, and in the bottom of the square recess 16 is a similar transverse panel 19 having a plurality of holes indicated collectively as 20 therethrough.

It will be observed that both the panels 17 and 19 have an equal number of apertures therethrough, and that the apertures are not only differently shaped but are differently spaced relative to the areas of the panels in which they are disposed.

In addition to the cabinet, a complete set of parts for a game according to our invention, includes a plurality of oblong blocks, in this case twelve, such as the block 21 seen in Figure 2. It is rectangular in basal conformation and adapted to slide downwardly into the recess 15. On the upper surface 22 of the block 21 is a picture of an object, in this case a man 23, and extended downwardly from the undersurface 24 of the block 21 is a wedge-shaped member 25 which is positioned relative to the undersurface 24 of the block so as to interfit with one slot seen at 26 in Figure 4, in the slotted panel 17 in the bottom of the recess 15.

A similar plurality of square blocks such as 27 in Figure 2 are dimensioned to interfit within the recess 16 and provided with downwardly extended plug members, such as 28, positioned relative to the undersurface 29 of the block so as to interfit with one hole such as 30 in the panel 19 forming the bottom of the recess 16.

Suitable indicia, in this case the word "man" is disposed on the upper surface of the blocks such as 27 as seen at 31, and in one preferred embodiment seen in Figure 5, the indicia "man" is disposed on a card 32 which interfits within lip members 33 and 34 fixedly attached along the upper and lower frontal edges of the block 27. This, or similar, means for changing the indicia or pictorial matter on the tops of the blocks is preferred since it permits changing the series of questions and answers to encompass a wide range of subject matter and educational material.

For instance, in addition to matching the written names to pictures of objects, the related series might include other associations of ideas such as the identification of colors; counting the numbers of objects shown; telling time; arithmetical problems such as multiplication, division and subtraction; identifying states and continents by their outlines or by the appearance of typical natives. In this manner the use of the device can be extended into higher grade levels and more mature spheres of interest.

There are also many manners in which the game of our invention may be played. For instance, a child may test himself to see how many associated blocks in a series he is able to match, or to see if he can match an entire series without making an error. In group play between a plurality of players, the variations, as can be understood, are virtually limitless.

The electro-mechanical operation of the device is clearly illustrated in the schematic diagram of Figure 6 which shows, at the left, three double throw switch asssemblies which are used beneath the slots in the bottom of the oblong recess of the device, and three pairs of adjacent contacts, at the right of the figure, which are used with an electrically conductive metallic wedge member to establish a flow of current through the pairs of contacts.

Furthermore, the three sets of double throw contacts, as seen at the left of the figure, constitute a cross section as it would appear if taken through the diagram of Figure 7 showing the complete switch assembly used beneath the panel 17 in the recess 15, and the three sets of contacts at the right of the figure similarly constitute a schematic cross section of the contact arrangement seen in Figure 8.

Referring again to Figure 6, the assemblies 35 and 36 are typical of those used adjacent the recesses 15 and 16 respectively. The assembly 35 is actually a double throw switch in which the movable contactor 37 communicates with the contact 38 of the pair of spaced contacts designated as 36. The other contactor 39 of the pair 36 is connected as indicated at 40 to one terminal of the power source, represented in the diagram by the battery 41. The central contactor 37 of the switch 35 is spring tensioned so that it normally communicates through the contact bar 42 and the lead 43 with the buzzer 44, the other buzzer terminal communicating directly as indicated at 45 with the other terminal of the power source 41.

As seen in Figure 6 the switches 35 and 36 are shown in the typical position of inoperative repose, and remain so until an electrically conductive spanner such as 46 is disposed between the contacts 38 and 39 in the same manner in which it is shown entered between the contacts 47 and 48 of the switch 52 wherein it serves to direct current from the bar 47 into the bar 48 which, in turn, communicates with the central contactor 49 of the switch assembly 50, and thence through the contact bar 51 through the conductor 43 to the buzzer 44, thereby sounding the buzzer.

The fragmentary section 46 is typical in the schematic diagram of Figure 6 of all of the electrically conductive plug members such as 28 in Figure 5, any of which serve in the same manner as that above described to direct current to the buzzer. However, when a nonconductive wedge member, such as that shown at 25 in Figure 2 depending from an oblong block such as 21 is inserted as indicated at 54 in switch 53 in Figure 6, the central contactor 55 is moved away from the contact bar 56 into contact with the other bar 57 which communicates through the conductor 58 with the light bulb 59 the other terminal of which communicates through the conductor 60 with the second terminal of the power source 41, thereby lighting the bulb 59.

Thus, as should be understood from the foregoing, the switches 36, 52 and 61 serve only to direct current to the central contactors of the switches 35, 50 and 53 respectively; and when the contacts of communicating switches are positioned as shown in the switches 35 and 36, no current is transmitted and there is no reaction; when the contacts are positioned as shown at 50 and 52, current is directed through the switch 50 to the buzzer 44; and when the contacts are positioned, due to the engagement of wedge and plug members therebetween, as shown at 53 and 61, current is directed to the light.

In Figure 7 the general arrangement of the oblong switch assembly is shown together with the manner in which it is positioned beneath and relative to the perforated panel 17 in the bottom of the recess 15. It will be seen in Figure 7 that the central contactors such as 55, 49 and 37 seen in section in Figure 6, are individual self-supported spring members, whereas the laterally disposed contact bars such as 56 and 57 are actually continuous bands in the multiple switch arrangement shown in Figure 7, each band serving four central contactors.

Similarly, in Figure 8 which is a similar plan view of the multiple switch assembly disposed beneath the perforated panel 19 in the bottom of the recess 16, one of each pair of contacts is a single movable unit, such as 64, 48 and 38 in Figures 6 and 8, whereas the other contact of each pair including 39, 47 and 63 in the two figures, is a transverse band operative in connection with several movable members. Also shown in Figure 8 is a fragment of the panel 19 showing the positioning of the holes 20 above the switching elements.

It is scarcely necessary to point out that the substitution of a considerable number of equivalents is possible with respect to many of the elements comprising the device of our invention in the form in which it has been set forth, all of which, it is believed, would fall within the scope of, and are anticipated by, our invention.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

We claim:

1. A puzzle device, comprising: a cabinet enclosing an electric buzzer, a power source and a first and second set of multiple switches and mounting an electric lamp and socket therefor with said electric lamp being in a position visibly observable from the exterior of said cabinet; said cabinet having a flat top surface; first and second recesses, of different shapes, disposed inwardly from the top surface of said cabinet and terminated inwardly in perforated bottom panels, said first and second sets of multiple switches being respectively disposed interiorly of said bottom panels of said first and second recesses; a first and a second plurality of plug members having body portions adapted in conformation to interfit respectively within said first and second recesses, and each one of said plugs having a wedge member extended outwardly from the undersurface of said body portion thereof receivable in a different one of said perforations in said bottom panels and engageable with said switch means disposed interiorly thereof; circuit means communicating from each one of said first set of switches with one different switch of said second set, and circuit means communicating between said power source, switches, lamp and buzzer, and being effective to direct current to said lamp when two communicating switches are engaged by plug members, and to direct current to and sound said buzzer when non-communicating switches are engaged.

2. The invention in accordance with claim 1 in which each one of said switches in one of said sets of switches is adapted when engaged by said wedge of said plug member to direct current to a different one of said switches in said other sets of switches.

3. The invention in accordance with claim 2 in which said switches in said other set of switches are adapted to direct current either to said lamp or said buzzer.

4. The invention in accordance with claim 3 in which said switches adapted to direct current either to said lamp or said buzzer are normally disposed so as to direct current to said buzzer.

5. The invention in accordance with claim 4 in which said switches normally directing current to said buzzer are adapted when engaged by said wedge member of said plug to direct current only to said lamp.

6. A puzzle device, comprising: a cabinet enclosing an electric buzzer, a power source and a first and second set of multiple switches and mounting an electric lamp and socket therefor with said electric lamp being in a position visibly observable from the exterior of said cabinet; said cabinet having a flat top surface; a first and a second recess disposed inwardly from the top surface of said cabinet and terminated inwardly in perforated bottom panels, said first recess being oblong and having a plurality of slits in the bottom panel thereof, said second recess being square and having a plurality of round holes therein, said first and second sets of multiple switches being respectively disposed interiorly of said bottom panels of said first and second recesses; a first and a second plurality of plug members having oblong and square body portions adapted in conformation to interfit respectively within said first and second recesses, and each one of said plugs having a wedge member extended outwardly from the undersurface of said body portion thereof receivable in a different one of said perforations in said bottom panels and engageable with said switch means disposed interiorly thereof; circuit means communicating from each one of said first set of switches with one different switch of said second set, and circuit means communicating between said power source, switches, lamp and buzzer, and being effective to direct current to said lamp when two communicating switches are engaged by plug members, and to direct current to and sound said buzzer when non-communicating switches are engaged.

7. The invention in accordance with claim 6 and being further characterized by said wedge members engageable with said switches of said second set of switches being conformed of electrically conductive material.

8. The invention in accordance with claim 7 being further characterized by said wedges of said first plurality of plugs engageable with said switches of said first set, being conformed of an electrically non-conductive material.

9. The invention in accordance with claim 8 being further characterized by said oblong body portions of said plugs having pictures of various objects disposed on the upper surfaces thereof, and said square body portions of said second plurality of plugs having the names of the objects disposed on their upper surfaces.

10. The invention in accordance with claim 9 in which the name of an object is disposed on the surface of the particular square plug which is adapted to engage the switch communicating with the switch engageable by the plug bearing the picture of the object.

11. The invention in accordance with claim 9 in which said pictures and said names are disposed on cards engageable under lip members fixedly attached along opposite edges of said body portions.

References Cited in the file of this patent

UNITED STATES PATENTS

| 2,539,077 | Hawkins | Jan. 23, 1951 |
| 2,656,617 | Composto | Oct. 27, 1953 |
| 2,697,882 | Gruot | Dec. 28, 1954 |